US012753905B2

(12) United States Patent
Crow et al.

(10) Patent No.: US 12,753,905 B2
(45) Date of Patent: Oct. 6, 2026

(54) SYSTEM AND METHOD FOR WIRELESS-ENABLED OBJECT LOCATION, TRACKING, AND DIRECTION PROVISION

(71) Applicant: FEDEX DATAWORKS, INC., Memphis, TX (US)

(72) Inventors: Bryan Crow, Harrison, AR (US); Nicole Dilley, Branson, MO (US)

(73) Assignee: FEDEX DATAWORKS, INC., Memphis, TN (US)

(*) Notice: Subject to any disclaimer, the term of this patent is extended or adjusted under 35 U.S.C. 154(b) by 236 days.

(21) Appl. No.: 18/438,104

(22) Filed: Feb. 9, 2024

(65) Prior Publication Data

US 2025/0257862 A1 Aug. 14, 2025

(51) Int. Cl.

*F21V 14/02* (2006.01)
*G01S 13/75* (2006.01)
*G05D 3/20* (2006.01)

(52) U.S. Cl.

CPC .............. *F21V 14/02* (2013.01); *G01S 13/75* (2013.01); *G05D 3/20* (2013.01)

(58) Field of Classification Search

None
See application file for complete search history.

(56) References Cited

U.S. PATENT DOCUMENTS

2014/0376768 A1* 12/2014 Troy ....................... G01S 17/46 382/103
2015/0363617 A1* 12/2015 Honore .............. G06K 7/10366 340/10.6
2018/0191079 A1* 7/2018 Apostolos ................. G01S 5/28
2021/0077198 A1* 3/2021 Meftah .................. A61B 90/39
2021/0231767 A1 7/2021 Hyatt et al.
2022/0141619 A1* 5/2022 Parikh ................... H04W 4/029 455/456.1
2023/0208420 A1* 6/2023 Lohbihler ............... G01S 13/10 324/171

OTHER PUBLICATIONS

Written Opinion of the International Searching Authority for application PCT/US2025/014536, dated Apr. 8, 2025. (Year: 2025).*

* cited by examiner

*Primary Examiner* — Bernarr E Gregory
(74) *Attorney, Agent, or Firm* — Finnegan, Henderson, Farabow, Garrett & Dunner, LLP

(57) ABSTRACT

An object locating system includes a first wireless device associated with a light emitting device, a second wireless device associated with an object, and a controller configured to perform operations. The operations include receiving an object identifier. The operations include determining a position of the light emitting device based on a first signal associated with the first wireless device. The operations further include determining a location of the object based on a second signal associated with the second wireless device. The operations include calculating an orientation offset and a distance to the object with respect to the position of the light emitting device. The operations also include determining whether the second wireless device is visible to the light emitting device based on the second signal. The operations include determining a first angle and a second angle based on the orientation offset and the distance to the object. The operations also include controlling one or more alignment devices based on the first angle and the second angle to align the light emitting device with the object.

20 Claims, 7 Drawing Sheets

SYSTEM AND METHOD FOR WIRELESS-ENABLED OBJECT LOCATION, TRACKING, AND DIRECTION PROVISION

TECHNICAL FIELD

The present disclosure relates generally to object locating, and more particularly to a system and method suitable for locating objects.

BACKGROUND

The efficient, safe, and secure shipment of freight, including but not limited to correspondence, materials, goods, components, and commercial products, is an important component in today's business, particularly in view of the international nature of most business enterprises. Freight often is shipped nationally and internationally by means of several different transportation devices, such as trucks, trains, ships, and airplanes. Before the freight reaches its destination, it is often handled by several different entities, such as truck companies, intermediate consolidators, rail ways, shipping companies, and airlines. Packages run the risk of being lost or hard to find in various settings, such as large facilities.

The parcels of freight may be exchanged between entities at different transfer points or hubs. At each hub, the parcels may be separated and transferred by different vehicles to different destinations. The parcels may be unloaded from a vehicle and then loaded onto another vehicle one or more times. The parcels may be stored in a docking facility, with many other packages.

The driver of each vehicle or the docking operator may be provided with one or more documents with identifying information for the parcels to assist in tracking the locations of the parcels in a computer system. For example, when the driver loads or unloads the parcels into a docking facility, the driver may scan the documents so that the computer system may be updated regarding the locations of the parcels and whether the parcels have been loaded or unloaded.

Because the driver or docking operator enters the identifying information for the parcels each time the parcels are loaded or unloaded, this tracking process may be time consuming and relatively inefficient. Also, there is an increased risk of error, for example, if the operator forgets to scan the documents or scans the wrong documents, which may increase the risk of delay in shipping or loss of freight. Also, since the identification information may be provided on the document handled by the driver and not on the parcels themselves, there may be an increased risk of delay in shipping or loss of freight if the driver misplaces the documents. Further, in a docking facility full of packages, some packages may become lost or misplaced, causing delays.

Current methods of tracking and locating lost packages within a facility are based on a user scanning a barcode on a shipment with a dock door computer, cell phone, or tablet connected to a forklift or other object transport vehicle. When scanning a shipment to update its location, the user must provide the location of the shipment using a bay and door layout. Bays and doors have measurement constraints (e.g., 20 feet by 20 feet) which may vary by facility. Location data in current systems are only accurate to within the measurement constraints of the bay and doors (e.g., 20 feet by 20 feet), which causes problems with attempting to track and locate packages. Moreover, with current methods, location data is purely reliant on user input.

Other methods of tracking and locating lost packages within a facility include using surveillance cameras, generating and sending messages to personal digital assistants (PDAs) to require workers to perform a physical search/audit, and using inventory management systems. Further, many current methods do not track packages in real time. In addition, current systems do not provide clear instructions on where the package is located or how to navigate to the package most efficiently. Further, current systems have usable range limitations, leading to inaccurate coverage of the facility. Accordingly, current methods are inefficient and time consuming.

The disclosed method and system are directed to overcoming one or more of the problems set forth above.

SUMMARY

One aspect of the present disclosure is directed to an object locating system. The object locating system may include a first wireless device associated with a light emitting device. The object locating system may also include a second wireless device associated with an object. The object locating system may also include a controller configured to receive an object identifier from a user interface, determine a position of the light emitting device based on a first signal associated with the first wireless device, determine a location of the object based on a second signal associated with the second wireless device, calculate an orientation offset and a distance to the object with respect to the position of the light emitting device, determine whether the second wireless device is visible to the light emitting device based on the second signal, determine a first angle and a second angle based on the orientation offset and the distance to the object, and control one or more alignment devices based on the first angle and the second angle to align the light emitting device with the object.

Another aspect of the present disclosure is directed to an object locating system that may include a plurality of light emitting devices, where each light emitting device is associated with a respective first wireless device. The object locating system may also include a second wireless device associated with an object. The object locating system may also include a controller configured to receive an object identifier from a user interface, determine a position of each light emitting device based on a first signal associated with each first wireless device, determine a location of the object based on a second signal associated with the wireless device, determine the closest light emitting device to the object, based on the positions of each light emitting device and the location of the object, calculate an orientation offset and a distance to the object with respect to the position of the closest light emitting device, determine whether the object wireless device is visible to the closest light emitting device based on the second signal, determine a first angle and a second angle based on the orientation offset and the distance to the object, and control one or more alignment devices using the first angle and the second angle to align the closest light emitting device with the object.

Yet another aspect of the present disclosure is directed to a method for illuminating an object. The method may include receiving an object identifier from a user interface. The method may also include determining, using a controller, a position of a plurality of light emitting devices based on a first wireless device associated with each respective light emitting device. The method may also include determining. Using the controller, a location of the object based on a second wireless device associated with the object. The method may also include determining the closest light emitting device to the object, based on the positions of each light emitting device and the location of the object. The method also includes calculating an orientation offset and a distance to the object with respect to the position of the closest light emitting device. The method may also include determining whether the second wireless device is visible to the closest light emitting device based on a signal from the second wireless device, determining a first angle and a second angle based on the orientation offset and the distance to the object, controlling one or more alignment devices using the first angle and the second angle to align the closest light emitting device with the object, and sending an illumination signal to the closest light emitting device to illuminate the object once the closest light emitting device aligns with the object.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have meanings commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative and are not intended to be necessarily limiting.

Locating objects in a large warehouse is one of the most challenging shipment operation problems due to the complexity (number of objects involved, size of a shipping dock) and nature of the operations, including time involved. The dynamic nature of shipment operations may make it difficult for operators to find objects and manually searching may be time-consuming and error-prone.

The present disclosure addresses at least the aforementioned issues by improving systems that detect wireless devices on objects in a warehouse. Among the objectives of the object locating system is to develop a customized solution for real-world package and shipment problems. Embodiments of the present disclosure uses active tracking on objects and is not subject to user input incorrectness.

Figure 1:
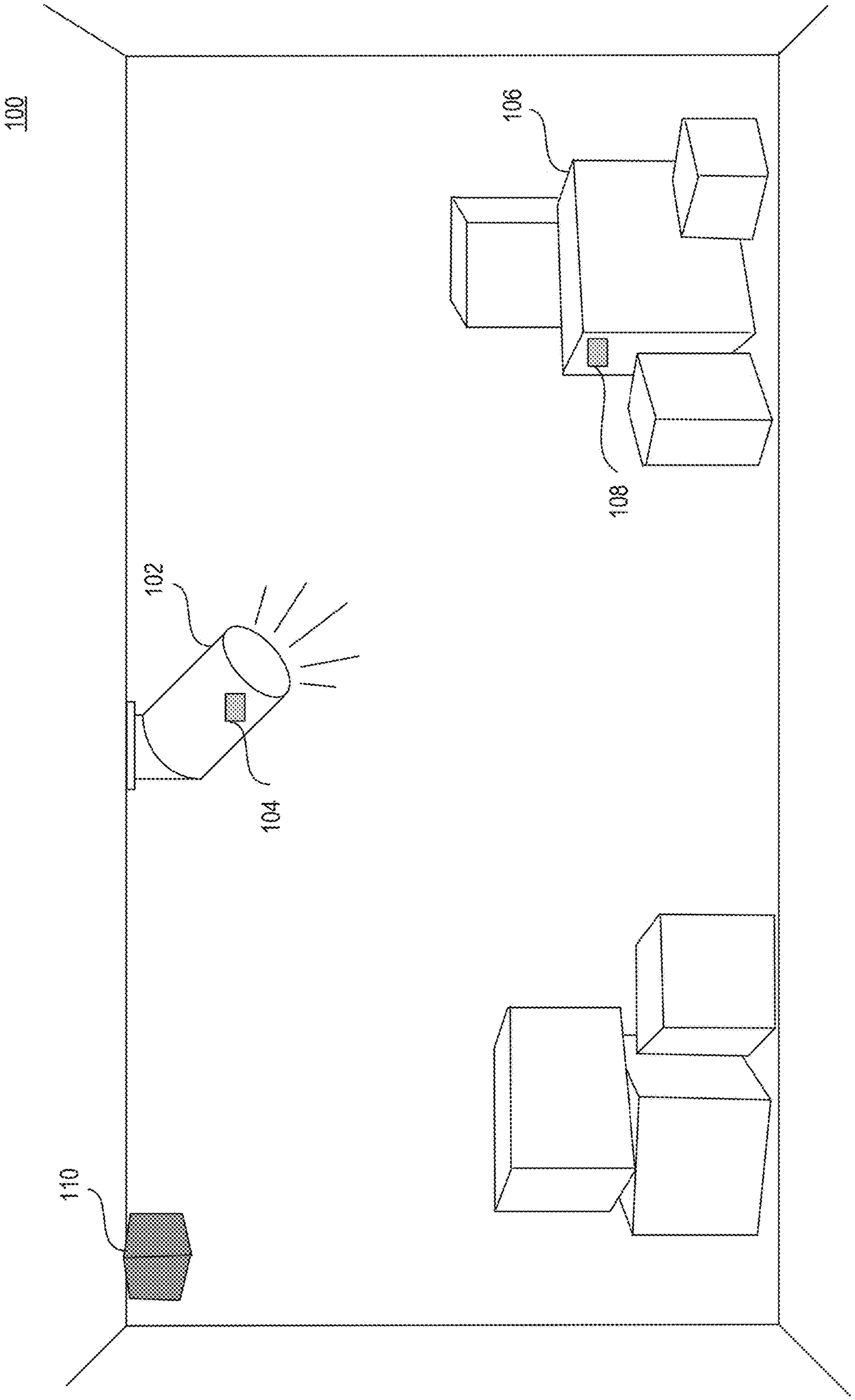
FIG. 1 is an exemplary object locating system including a light emitting device and object, consistent with disclosed embodiments.

FIG. 1 shows an exemplary object locating system, according to disclosed embodiments. Object locating system 100 includes light emitting device 102, first wireless device 104, object 106, second wireless device 108, and controller 110. In some embodiments, light emitting device 102 is associated with first wireless device 104. Object 106, in some embodiments, may be associated with second wireless device 108. Wireless device (e.g., first wireless device 104, second wireless device 108) may refer to a device that communicates without physical cables or wires and exchanges data over the air. Non-limiting examples of wireless devices (e.g., first wireless device 104, second wireless device 108) include mobile devices with wireless technologies such as Wi-Fi™ wireless local area networking technology, Bluetooth™ short-range wireless communication technology, cellular network connection or other technologies that may exchange data and communicate with other devices (e.g., other wireless devices devices). In some embodiments, wireless devices (e.g., first wireless device 104, second wireless device 108) include RFID tags, tablets, smartphones, GPS trackers, GPS systems, cellular trackers, near field tags, smart packing devices, Bluetooth™ trackers, or any other device that has the ability to track location wirelessly.

In some embodiments, first wireless device 104 is associated with light emitting device 102. For example, in some embodiments, the first wireless device 104 is attached to the light emitting device 102. For example, the first wireless device 104 may be attached to the light emitting device 102 using adhesive, bands, protective enclosures, screws, clamps, mounts, magnets, custom mounting solutions, or any other way to physically secure the first wireless device 104 to the light emitting device 102. In other embodiments, the first wireless device 104 is embedded in the light emitting device 102. For example, the first wireless device 104 may be embedded in the light emitting device 102 using a cavity, enclosure, mold, surface integration, grooves, channels, sealed modules, or printed electronics. In yet other embodiments, the first wireless device 104 communicates with the light emitting device 102 using aforementioned wireless technologies such as Wi-Fi™, Bluetooth™, cellular network, or other technologies.

The light emitting device 102 refers to objects that emits light. For example, light emitting device 102 may refer to one or more of lasers, LEDs, micro-LEDs, OLEDs, Li-Fi bulbs, visible light communication systems, holographic displays, spotlights, light detection and ranging (Lidar) systems, structured 3D scanning displays, infrared lights, projections, or directionally sensitive arrays. In one embodiment, the light emitting device 102 includes a directionally sensitive array, used to achieve enhanced directivity in the direction of the object 106. The directionally sensitive array may also be used to focus signals or light in a desired direction, while minimizing sensitivity in other directions. It is to be appreciated, in some embodiments, more than one wireless device may be associated with the light emitting device 102. In other embodiments, one wireless device may be associated with more than one light emitting device 102.

In some embodiments, at least one of the first wireless device 104 or the light emitting device 102 are mounted on a ceiling. Mounting refers to installing or attaching an object or device to the surface of a ceiling, wall, crossbeam, base plate, pole, rafters, vehicle, or other surface. Mounting, in some embodiments, involves using various hardware and support structures to securely fix at least one of the first wireless device 104 or light emitting device 102 on a ceiling. Hardware and support structures for mounting may include screws, brackets, clamping bolts, or mounting kits. Ceiling, in some embodiments, may refer to the upper interior surface of a room, building, vehicle, or other structure. In an embodiment, first wireless device 104 or light emitting device 102 are mounted on the ceiling of a building or room, so that the light emitting device 102 is configured to point towards the object 106, where the object 106 is located below the ceiling. In some embodiments, alignment devices are configured so that depending on the mounting of the first wireless device 104 or light emitting device 102 on the ceiling, the alignment devices may align the light emitting device 102 with the object 106. As described in detail below and with respect to FIG. 6, some embodiments involve mounting first wireless device 104 on a baseplate 610 with alignment devices (e.g., x-direction motor 602, y-direction motor 604). The baseplate 610, in some embodiments, is attached to metal rafters 608 of the building and the light emitting device 102 shines downwards toward object 106. Alignment devices, such as x-direction motor 602 and y-direction motor 604, adjust light emitting device 102. In some embodiments, the second wireless device 108 is associated with the object 106. In some embodiments, the second wireless device 108 is attached to the object 106. In other embodiments, the second wireless device 108 is embedded in the object 106. In yet other embodiments, the second wireless device 108 communicates with the object 106 using aforementioned wireless technologies such as Wi-Fi™, Bluetooth™, cellular network. Object 106 refers to one or more packages, boxes, items, or any other physical item. It is to be appreciated, in some embodiments, more than one wireless device may be associated with an object 106. In other embodiments, one wireless device may be associated with more than one object 106.

It is to be appreciated the object locating system 100 of the present disclosure may include multiple wireless devices (e.g., first wireless device 104, second wireless device 108) that may or may not be the same type of wireless device. For example, the first wireless device 104 may be a tablet while the second wireless device 108 may be a RFID tag. In another embodiment, the first wireless device 104 is an RFID reader and the second wireless device 108 is a RFID tag. The first wireless device 104 and second wireless device 108 may communicate with one another, such as through Wi-Fi™, Bluetooth™, cellular networks (e.g., 3G, 4G, LTE, 5G), near field communication (NFC), radio-frequency identification (RFID), satellite communication, infrared, wireless sensor networks, or any other way to exchange data without physical cables or physical connection. Further, it is to be appreciated the first wireless device 104 may communicate with more than one second wireless device 108 and vice versa. In other embodiments, first wireless device 104 communicates with more than one second wireless device 108, as described with respect to at least FIG. 3B.

In some embodiments, controller 110 is configured to perform tasks, instructions, or operations. Controller 110, in some embodiments, may include any physical device or group of devices having electric circuitry that performs a logic operation on an input or inputs. In some embodiments, the controller 110 manages the operation of other devices, components, or systems. Controller 110 may comprise one or more electronic processors used to process instructions inside of a computer or other electronic system. For example, a controller 110 may include one or more integrated circuits (IC), including an application-specific integrated circuit (ASIC), a microchip, a microcontroller, a microprocessor, all or part of a central processing unit (CPU), a graphics processing unit (GPU), a digital signal processor (DSP), a field-programmable gate array (FPGA), a neural processing unit (NPUs), an AI accelerator, a server, a virtual server, a virtual computing instance (e.g., a virtual machine or a container), a microprocessor, or other circuits suitable for executing instructions of performing logic operations. For example, the one or more electronic processors may be created by one or more of Intel, AMD, Nvidia, Qualcomm, Apple, or IBM. The instructions executed by at least one controller 110 may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions.

In some embodiments, the controller 110 may include more than one controller. Each controller 110 may have a similar construction, or the controllers may be of differing constructions that are electrically connected or disconnected from each other. For example, the controller 110 may be separate circuits or integrated in a single circuit. When more than one controller 110 is used, the controller 110 may be configured to operate independently or collaboratively and may be co-located or located remotely from each other. The controller 110 may be coupled electrically, magnetically, optically, acoustically, mechanically or by other means that permit them to interact. Some disclosed embodiments may be software-based and may not require any specified hardware support. Controller 110, in some embodiments, may be positioned anywhere such that controller 110 is able to communicate with at least one of the first wireless device 104 or the second wireless device 108, receive the first signal or the second signal, or otherwise communicate with and control object locating system 100. In some embodiments, controller 110 is mounted on the ceiling. In other embodiments, controller 110 is fixed on the room floor or attached to the light emitting device 102. In yet other embodiments, controller 110 is located in another room, in a server cabinet in a remote location, or in any other location where controller 110 can communicate with object locating system 100.

Figure 2:
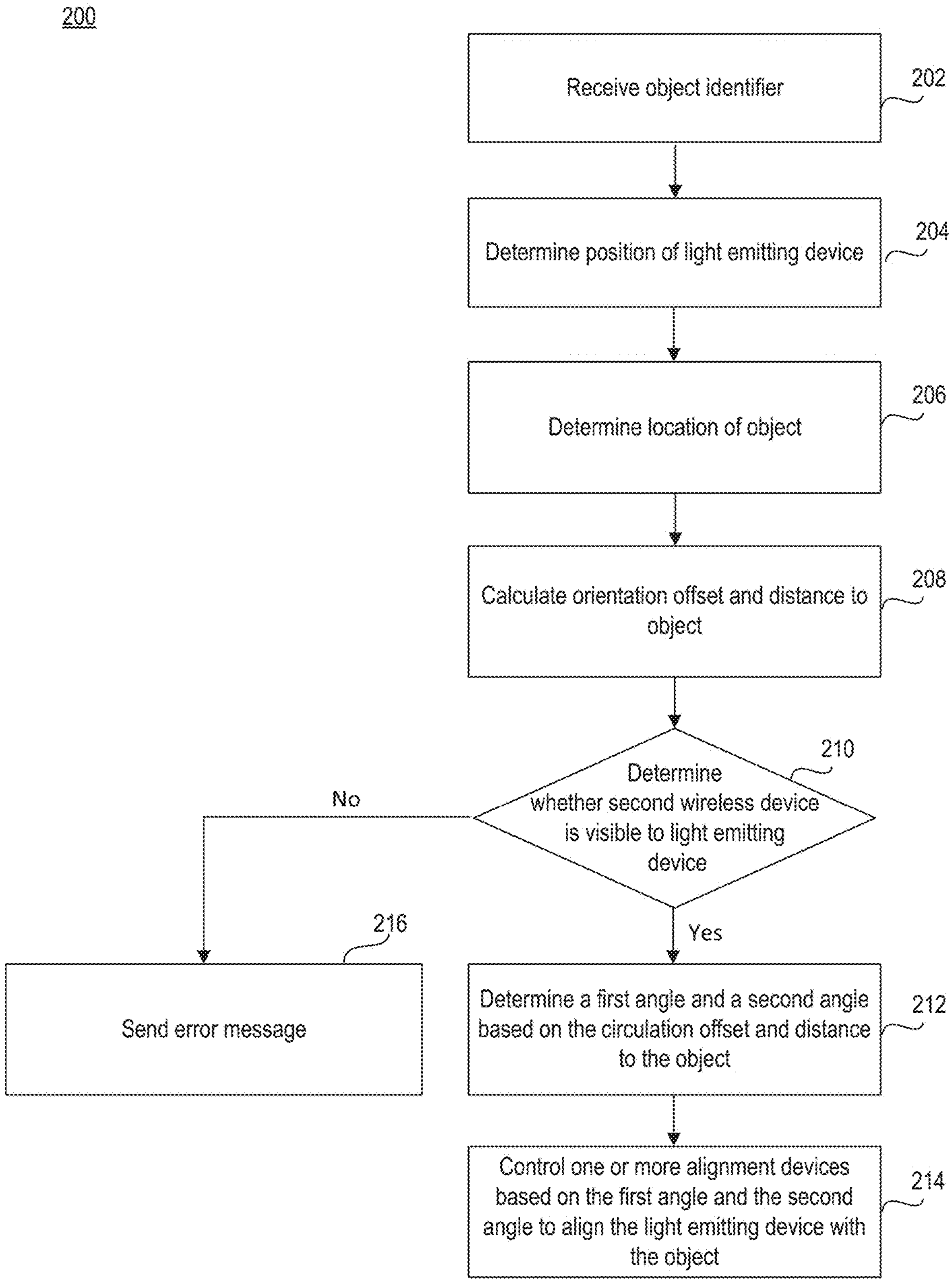
FIG. 2 is an exemplary system flow diagram of controller operations of an object locating system, consistent with disclosed embodiments.

FIG. 2 shows exemplary operations controller 110 performs, consistent with disclosed embodiments. According to some embodiments, controller 110 may receive an object identifier in step 202, determine a position of the light emitting device 102 in step 204, determine a location of the object 106 in step 206, calculate an orientation offset and distance to the object 106 in step 208, determine whether the second wireless device 108 is visible to the light emitting device 102 in step 210, determine a first angle and a second angle based on the orientation offset and distance to the object 106 in step 212, and control one or more alignment devices based on the first angle and the second angle to align the light emitting device 102 with the object 106 in step 214.

If the second wireless device 108 is not visible to the light emitting device 102, controller 110 may send an error message in step 216.

In some embodiments, the controller 110 receives an object identifier, as shown in step 202. In some embodiments, controller 110 receives object identifier from a user interface, receives an object identifier associated with an oldest package on a periodic basis, receives an object identifier associated with a missing package, receives an object identifier associated with a late package, or any other way to receive an object identifier. An object identifier refers to a way of uniquely identifying an object 106. For example, an object identifier may involve unique identifiers (UIDs), object identifiers (OIDs), barcodes, QR codes, RFID tags, tracking numbers, shipping label information, coordinate information, GPS tracking, The Real-time Operating system Nucleus (TRON) numbers unique serial numbers, geofencing, sensor information, information relating to a real-time tracking system (e.g., Sense Aware), handling unit numbers, or any other way of identifying an object 106. A user interface refers to point of interaction between a user and system (i.e., computer or hardware system). Non-limiting examples of user interfaces include graphical user interfaces (GUIs), command-line interfaces (CLI), voice user interfaces (VUI), natural language interfaces, touchscreen interfaces, virtual reality interfaces, web-based interfaces, websites, or applications. In some embodiments, a user inputs object identifier into a user interface by scanning, typing, voice inputting, or any other means of inputting information into a user interface. For example, in an embodiment, a user may interact with a GUI by entering a RFID tag number. Controller 110 may store object identifier in an internal or external database, cloud, or any other data storing mechanism.

According to some embodiments, the controller 110 determines a position of the light emitting device 102 based on a first signal associated with the first wireless device 104, as shown in step 204. The position of the light emitting device 102 refers to the location or placement of the light emitting device 102. In some embodiments, the position of the light emitting device 102 is fixed (e.g., on a ceiling). An administrator, in some embodiments, inputs data representing a fixed position of the light emitting device 102 into a file or database accessible by the controller 110. In some embodiments, controller 110 stores the fixed position of the light emitting device 102 in a file, database, or other means of storing information. In some embodiments, controller 110 receives a first signal from the first wireless device 104, including information related to the position of the light emitting device 102. For example, an RFID signal may include location information stored in RFID tags. In some embodiments, controller 110 may store position information from the first signal. In other embodiments, controller 110 may update existing position information based on updated or real-time position information from the first signal.

By way of non-limiting example, an RFID system tracks locations of object 106, based on RFID tag adhered to object 106. Controller 110 ingests data using a software platform for real-time data pipeline generation (e.g., Apache Kafka™). Controller 110 may then send the data ingested through the platform into a Kubernetes™ container orchestration platform. The Kubernetes™ container orchestration platform runs a framework for building standalone, production-grade applications such as web applications, microservices, and enterprise-grade software solutions (e.g., Spring Boot Java™).

A framework for building applications (e.g., Spring Boot Java™) may interpret location data and derive events from raw location data. In an embodiment, the RFID system can interpret the raw location data. RFID readers, in some embodiments, may utilize two compute windows. Compute windows, in some embodiments, refer to a specific time period or interval during which computational tasks or processes are executed. In embodiments of this disclosure, compute windows refer to the amount of time that the RFID reader uses its RFID singulations (i.e., an identification of an RFID tag with a specific serial number) to calculate a location.

In some embodiments, a first compute window may be responsive to movement and may be relatively short in time (e.g., 2 seconds) when compared to another compute window (e.g., second compute window). The second compute window, in an embodiment, may be relatively long (e.g., 8 seconds) when compared to another compute window (e.g., first compute window) and may provide fixed location information. Controller 110, in some embodiments, may monitor the first compute window consistently, to determine if an RFID tag is in motion. The controller 110, in some embodiments, averages location information from several RFID readers. In some embodiments, if the controller 110 determines the location of the RFID tag is fixed, controller 110 uses the second compute window to determine the RFID tag location. In some embodiments, controller 110 constantly monitors the compute windows or monitors the compute windows according to a predetermined schedule.

Controller 110, in some embodiments, can adjust what compute window is considered to determine object 106 location (e.g., first compute window, second compute window), based on detected RFID tag movement. In some embodiments, the controller 110 considering a compute window (e.g., first compute window, second compute window) refers to the controller 110 monitoring, analyzing, extracting data from, or making decisions based on information (e.g., timing, movements, location) from the compute window. Controller 110, in some embodiments, may employ adaptive algorithms that dynamically adjust the compute window based on real-time information (e.g., object 106 location information, RFID tag information). Adaptive algorithms may include techniques such as machine learning, reinforcement learning, or predictive analytics to optimize the compute window for specific conditions or objectives.

In some embodiments, controller 110 can dynamically change the timeframe or interval during which it analyzes data to determine the location of object 106. For example, if the RFID tag was stationary at an earlier point in time, but controller 110 determines the RFID tag is moving at a current point in time, controller 110 may consider the first compute window. In some embodiments, controller 110 dynamically adjusts compute windows based on factors such as the speed of object 106 being tracked or system requirements. In other embodiments, controller 110 uses data from RFID tags to determine the location of object 106 within a specified compute window. By adjusting the compute window, the controller 110 may optimize the accuracy and reliability of object 106 location estimation. Controller 110, in other embodiments, may adapt to changing conditions in real-time, so that object 106 location information is accurate.

RFID tag location data, in some embodiments, is determined in an application stack. Application stack refers to a collection of software tools, frameworks, libraries, and technologies used to develop and run a software application. For example, controller 110, in some embodiments, may run an application responsible for determining if a tag is stationary or in motion. The application, in some embodiments, may also average location data from multiple RFID readers, discards outliers, and inspects confidence values to determine the best way to generate a location event for the RFID tag.

In some embodiments, events are derived based on the location of an RFID tag. Non-limiting examples of events include trailer, dock, bay, door load, door unload, object transport vehicle (e.g., forklift) movement, location change, last known location, object transport vehicle to shipment association, and misload events. The location events, in some embodiments, are derived from the locations of the shipments and the locations of the object transport vehicle. In some embodiments, the load and unload events are created on an object transport vehicle moving to within a scoring fence. After the scoring fence scores the object transport vehicle to be associated to the object 106 (e.g., shipment), a Shipment to Lift Association (SLAT) event may be created. As the object transport vehicle gains weight on the object transport vehicle blades and moves, load and unload events are calculated on the object transport vehicle location or object 106 location, based on where the weight is removed from the object transport vehicle or added to it. In some embodiments, last known location events are constantly being updated based on the RFID tag. Location change events, in some embodiments, occur when controller 110 determines RFID tag has moved without the aid of a object transport vehicle. Object transport vehicle movement events, in some embodiments, occur when an object transport vehicle progresses from one location on the dock to another.

In an embodiment, the platform for deploying, scaling, and managing containerized applications (e.g., Kubernetes™) determines the closest light emitting device 102 (e.g., laser) on the ceiling to the requested object 106. The platform (e.g., Kubernetes™), in an embodiment, inputs a request (e.g., REST HTTPS™) from the user and makes a service call to a service that has the last known location of all objects the RFID system is aware of. Request may be a command from controller 110 or from user through user interface. REST HTTPS request refers to a request made to a web server using Hypertext Transfer Protocol Secure (HTTPS) protocol in adherence with the principles of Representational State Transfer (REST). Requests may also be simple object access protocol (SOAP™), gRPC Remote Procedure Calls (gRPC™), GraphQL™ query language for APIs, WebSocket™ real-time bidirectional communication protocol, Advanced Message Queuing Protocol (AMQP™), RSocket™ reactive streaming communication protocol, or any other communication protocol. The platform for managing containerized applications (e.g., Kubernetes™) may also be aware of the location of all the light emitting devices, based on location data entered into a database by a user interface. Non-limiting examples of database include MySQL™ open-source relational database management system, Oracle™ enterprise relational database management system, Microsoft™ SQL Server™ relational database management system, or Cassandra™ distributed NoSQL database management system. In some embodiments, laser location data is entered into an Apache database (e.g., Cassandra™) through a user interface that calls the REST HTTPS service of the application performing the tasks. In an embodiment, lasers mounted in the ceiling are wired with power over ethernet for data. The application handling user requests, in some embodiments, determines the last known location of the object 106 and the closest laser to the object 106 makes a service call to the closest laser.

In some embodiments, the position of the light emitting device 102 is determined by GPS, RFID, Bluetooth™, Wi-Fi™, machine learning, cellular network, geofencing, inertial navigation systems, sensors, satellite navigation systems, visual recognition, or computer vision. The position of the light emitting device 102, in some embodiments, may be given in geographic coordinates, relative position, or any other way of distinguishing a position or location. In some embodiments, a zero position is designated, such as a corner of a room, The position of the light emitting device 102 may be a coordinate position relative to the zero position (e.g., designated corner of room). In another embodiment, the position of the light emitting device 102 is given in geographic coordinates. In some embodiments, the position of the light emitting device 102 is determined by a first signal associated with the first wireless device 104. Non-limiting examples of first signals associated with the first wireless device 104 include GPS, cellular, Wi-Fi™, Bluetooth™, RFID, LiDar, laser, infrared, computer vision, or any other signal which can be used or manipulated to identify a location. In some embodiments, the first signal includes a position of the light emitting device 102 or the first wireless device 104. In an embodiment, the controller 110 receives first signals from the first wireless device 104, which includes location information. In some embodiments, the light emitting device 102 is fixed and the controller 110 uses the stored position of the light emitting device 102 as the position of the light emitting device 102. The controller 110, in some embodiments, may store the position of the light emitting device 102 to perform other tasks.

In some embodiments, the controller 110 determines a location of the object 106 based on a second signal associated with the second wireless device 108, as in step 206. Location of the object 106 refers to the position or placement of the object 106. For example, location of the object 106 may be determined by GPS, RFID, Bluetooth™, Wi-Fi™ positioning, cellular network, geofencing, inertial navigation systems, visual recognition, or computer vision systems or signals. The second signal associated with the second wireless device 108 may be signals from the second wireless device 108, such as GPS, cellular, Wi-Fi™, Bluetooth™, RFID, LiDar, laser, infrared, computer vision, or any other signal which can be used or manipulated to identify a location. In an embodiment, the controller 110 may receive second signals from the second wireless device 108, which includes location information. The controller 110, in some embodiments, may store the location of the object 106 and use the location of the object 106 to perform other tasks.

In other embodiments, the first wireless device 104 and the second wireless device 108 communicate with each other to determine the position of the light emitting device 102 and location of the object 106. In some embodiments, the positions and locations are relative to one another. For example, the first wireless device 104 may be a RFID reader and the second wireless device 108 may be an RFID tag. The RFID tag, in some embodiments, may emit radio signals that are detected by RFID readers. The RFID reader may determine the location of the RFID tag, based on the radio signal.

In some embodiments, the controller 110 calculates an orientation offset and a distance to the object 106 with respect to the position of the light emitting device 102, as in step 208. In some embodiments, the orientation offset and distance to the object 106 are determined based on the position of the light emitting device 102 (e.g., from step 204) and the location of the object 106 (e.g., from step 206).

Orientation offset refers to a deviation or difference in the orientation or position of the light emitting device 102 with respect to the object 106. In some embodiments, the orientation offset is an angular difference between two orientations, directions, or locations. Distance to the object 106 with respect to the position of the light emitting device 102, in some embodiments, refers to a horizontal distance (x-distance), vertical distance (y-distance), diagonal distance (z-distance), or any other measurement of distance between the object 106 and light emitting device 102. The controller 110, in some embodiments, stores the orientation offset and distance information. Further, the controller 110 may use or manipulate the orientation offset or distance information to perform other tasks or operations. In some embodiments, the controller 110 compares the position of the light emitting device 102 to the location of the object 106 to calculate the orientation offset and distance to the object 106. The controller 110, in some embodiments, may be configured to perform operations, such as determining the orientation offset and distance to the object 106 using geometric principles such as Pythagorean theorem.

By way of non-limiting example, measurements of room, facility, or service center may be known. An arbitrary point, in some embodiments, is defined on a grid system, where the point includes an x-coordinate and a y-coordinate (e.g., (0,0)). In an embodiment, laser appliances mounted on the ceiling are mounted at an x-coordinate and y-coordinate (i.e., (x,y)) based on distance from the arbitrary point (e.g., (0,0)). It is to be appreciated not all facilities, rooms, buildings, service centers are linear, such that the laser applications are mounted in such a way that they are askew of the arbitrary point. Because of this, lasers must account for the rotation of the device as it relates to the x-coordinate and y-coordinate grid of the facility. In some embodiments, the orientation offset accounts for the rotation of the laser as it relates to the x-coordinate and y-coordinate grid of the arbitrary point. In another embodiment, the orientation offset is the x-coordinate and y-coordinate distance from the object 106 to the laser. For example, if the object 106 is located at (10,20) and the laser is located at (15, 25), the orientation offset would be 5 in the x-direction and 5 in the y-direction. Controller 110, in some embodiments, uses the orientation offset (e.g., 5 in x-direction and 5 in y-direction) to determine the first angle 306, as described in more detail with respect to FIG. 3A below.

According to some embodiments, the controller 110 determines whether the second wireless device 108 is visible to the light emitting device 102 based on the second signal, as in step 210. The second wireless device 108 being visible to the light emitting device 102 may refer to the second wireless device 108 being physically visible to the first wireless device 104 or the light emitting device 102. In other embodiments, the second wireless device 108 being visible to the light emitting device 102 refers to the second signal being received by the controller 110, first wireless device 104, or second wireless device 108. In further embodiments, the second wireless device 108 being visible to the light emitting device 102 includes the second wireless device 108 being within a threshold or range of the light emitting device 102. In the event obstructions in the facility prevent a laser from pointing directly at the object 106 (e.g., grid sections in facility), visibility is based on a radius from the location of the object 106 to the light emitting device 102. If a requested object 106 fell within the radius of multiple light emitting devices, the light emitting device 102 with the shortest distance away from the object 106 illuminates object 106.

In some embodiments, the controller 110 determines whether the second wireless device 108 is visible to the light emitting device 102 based on the real-time location data. Real-time location data may be from any system that provides live updates on the current position of object 106. For example, real-time location data may be from GPS systems, cellular networks, Wi-Fi™ networks, Bluetooth™ systems, RFID, inertial navigation systems, satellite-based communication, IoT platforms, real-time location systems, machine-to-machine communication, cloud-based tracking services, or any other means of providing live location information. In some embodiments, the second wireless device 108 provides the real-time location data via second signal. The determination being based on real-time location data allows for real-time adjustment of the position of the light emitting device 102, location of the object 106, determination of the first angle and the second angle, calculation of the orientation offset and distance to the object 106, and adjustment of the alignment devices.

Controller 110, in some embodiments, adjusts operations (e.g., determinations, calculations, controls) according to real-time location data. Real-time location data refers to continuously updated and current information about the position, location, or coordinates of object 106, light emitting device 102, or other item, device, or component. In some embodiments, the real-time location data is constantly refreshed, up-to-date, and precise. Real-time location data may be generated from GPS, RFID, Bluetooth™, Wi-Fi™, cellular network, or other technologies that provide location information. In some embodiments, controller 110 accounts for real-time location data (e.g., of the light emitting device 102 and object 106), through a feedback loop. For example, controller 110 may refresh the position of the light emitting device 102, location of the object 106, and the calculations of orientation offset and distance to object 106 according to the real-time location data. For example, if controller 110 receives real-time location data of the object 106 indicating a new location of the object 106, controller 110 may re-calculate the orientation offset and distance to the object 106. Further, controller 110 may re-determine whether the second wireless device 108 is visible to the light emitting device 102 based on the second signal, re-determine the first angle 306 and the second angle 308 (as described with respect to FIG. 3A), and control the alignment devices accordingly.

If the controller determines the second wireless device 108 is not visible to the light emitting device 102, the controller 110 may send a message to the user interface, as in step 216. A message to the user interface, in some embodiments, indicates the second wireless device 108 is not within an operable range. The range, in some embodiments, refers to the maximum distance or coverage area second wireless device 108 can establish and maintain a reliable wireless connection. In some embodiments, second wireless device 108 may be out of range due to the wireless technology used (e.g., Wi-Fi™, Bluetooth™, cellular network device), the frequency band, physical obstacles, interference, power transmitted, environmental conditions, or any other factor that impacts functionality. Determining second wireless device 108 is out of range, in some embodiments, involves monitoring the signal strength or quality between first wireless device 104 and second wireless device 108. Further, determining second wireless device 108 is out of range may involve analyzing signal strength metrics (e.g., dBm), monitoring connection quality (e.g., signal-to-noise ratio, bit error rate), or constructing signal strength maps. It is to be appreciated first wireless device 104 may be out of range in lieu of second wireless device 108 or in addition to second wireless device 108. In yet another embodiment, a message is sent to the user interface indicating the second wireless device 108 is currently not visible and the user interface displays the last known location of the object 106. In some embodiments, the user requests that the last known location of the object 106 is illuminated.

In some embodiments, the user may select from a number of options on the user interface including re-entering the object identifier, searching again based on the previously entered object identifier, or searching for another object 106. In further embodiments, controller 110 may be configured to perform operations such as re-calculate the orientation offset and distance to the object 106, and then re-determining whether the second wireless device 108 is visible to the light emitting device 102 based on the new calculations.

Figure 3A:
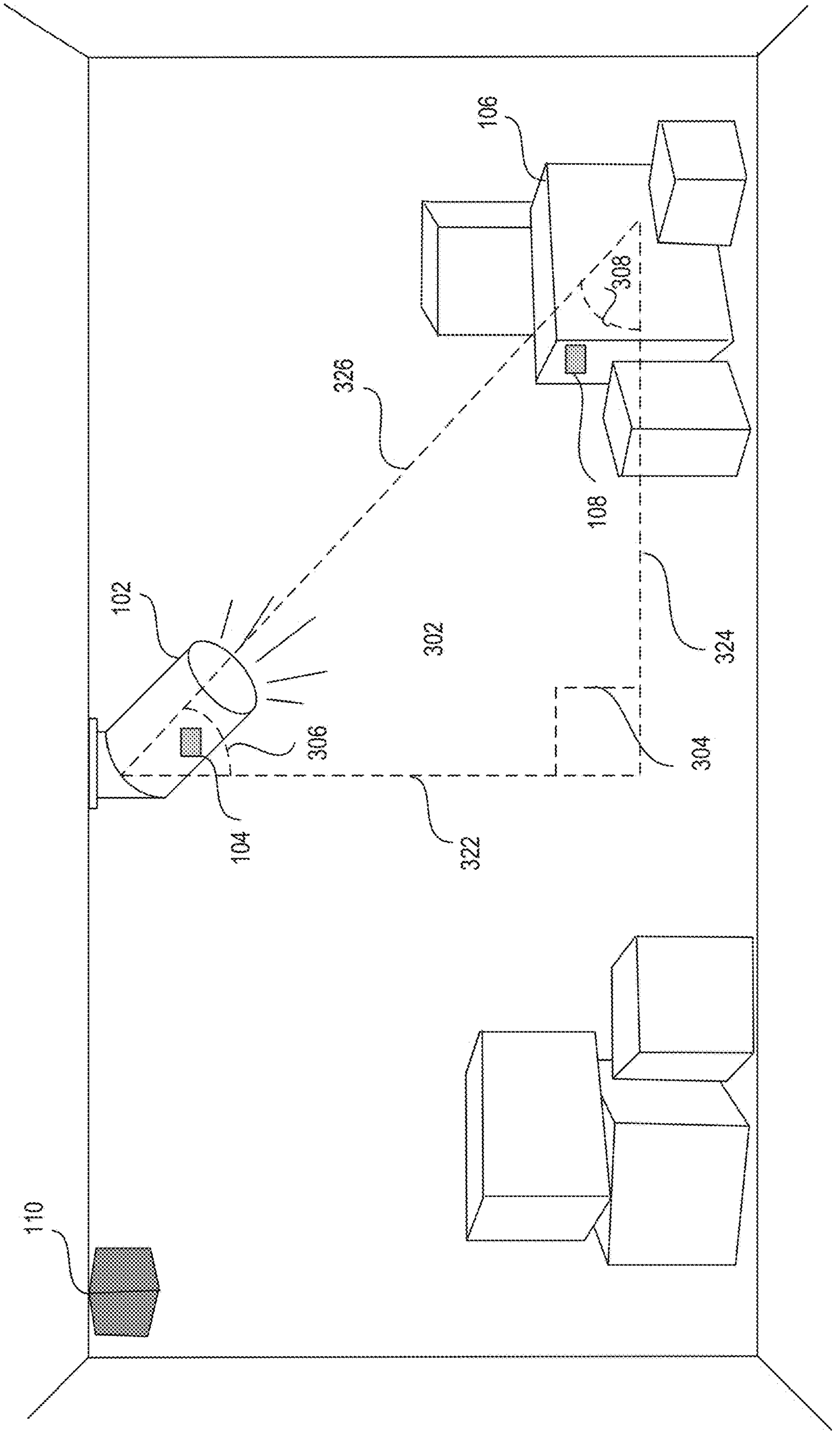
FIGS. 3A and 3B are diagrams of exemplary object locating systems with one light emitting device and a plurality of light emitting devices, respectively, consistent with disclosed embodiments.

If the controller 110 determines the second wireless device 108 is visible to the light emitting device 102, the controller 110 may determine a first angle 306 and a second angle 308 based on the orientation offset and the distance to the object 106, as shown in step 212. With reference to FIG. 3A, in some embodiments, controller 110 may use right triangle geometric properties to make approximations and calculations related to orientation offset and distance to the object 106. For example, in some embodiments, controller 110 determines a right triangle 302 between the light emitting device 102 and object 106, using three points (e.g., a first point associated with the light emitting device 102, a second point associated with the object 106, and a third point associated with another location). Controller 110, in some embodiments, determines a first angle 306 and a second angle 308 of the right triangle 302 based on the lengths of sides of the right triangle 302 and using trigonometric and geometric principles such as the Pythagorean theorem. In some embodiments, the right triangle 302 includes a right angle 304, first angle 306 whose vertex is associated with the light emitting device 102, second angle 308 whose vertex is associated with the object 106, a first side 322, a second side 324, and a third side 326. The vertex of the first angle 306, in some embodiments, is located at the base of the light emitting device 102, the center of the light emitting device 102, the center of the first wireless device 104, or any other location on the light emitting device 102. The vertex of the second angle 308, in some embodiments, is located at the base of the object 106, the center of the object 106, the center of the second wireless device 108, or any other location of the object 106. The first side 322, in some embodiments, is the shortest distance from the light emitting device 102 to the floor of the facility. In other embodiments, the first side 322 is the shortest distance from the light emitting device 102 to a point vertical from the light emitting device 102, downward towards the floor of the facility. In some embodiments, the right angle 304 connects the first side 322 and the second side 324. The second side 324, in some embodiments, is the distance from the object 106 to the vertex of the right angle 304. In other embodiments, the second side 324 is the distance from the endpoint of the first side 322 to the object 106. The third side 326, in some embodiments, is the hypotenuse of the right triangle 302. In some embodiments, the third side 326 connects the first angle 306 to the second angle 308. The third side 326, in some embodiments, is the distance between the object 106 and the light emitting device 102. It is to be appreciated the right triangle 302 may be used for approximating and calculating distances and angles between the object 106 and light emitting device 102. In some embodiments, the first side 322 is known and input into a database. The second side 324 can be determined by the x-distance from the light emitting device 102 to the object 106. The third side 326 can be determined using the Pythagorean theorem, since the first side 322 and second side 324 are known. Using geometric properties, the second angle 308 can be determined based on the known sides. The second angle 308 may be used to determine the angle for a servo to point in the correct x-direction or y-direction towards the object 106. Similarly, the first angle 306 can be determined using geometric properties and used to determine the angle for a servo to point in the correct x-direction or y-direction.

In some embodiments, the controller 110 controls one or more alignment devices based on the first angle 306 and the second angle 308 to align the light emitting device 102 with the object 106, as in step 214. Alignment devices refer to tools or equipment designed to ensure the light emitting device 102 is aligned with the object 106 or wherever the light emitting device 102 is intended to illuminate. Alignment devices may be attached to the light emitting device 102 and be used to adjust the positioning of the light emitting device 102 or otherwise manipulate the direction of light from the light emitting device 102. For example, the alignment devices may involve servos, motors, mirrors, prisms, beam splitters, lenses, fiber optic devices, micro-mechanical systems (MEMS), or any other way to adjust the light emitting device 102 or light.

In some embodiments, one or more alignment devices are controlled based on the first angle 306 and one or more alignment devices are controlled based on the second angle 308. For example, in an embodiment, the controller 110 determines servos need to adjust the first angle 306 and second angle 308 to align the light emitting device 102 with the object 106. The controller 110, in some embodiments, calculates how far the servos need to move to align the light emitting device 102 with the object 106. The controller 110, in some embodiments, calculates the orientation offset between the current position of the light emitting device 102 and the object 106, and determines the first angle 306 and the second angle 308 based on the difference in current position and desired position. By way of example, servos can be used as alignment devices. In some embodiments a pulse-width modulated signal is sent to a servo, causing the servo to move to a fixed location. In another embodiment, a stepper motor with end stops is used as an alignment device. In some embodiments, the stepper motor counts the number of steps per movement, and the location resets by testing against the end stops to determine a minimum and maximum x and y value. The number of steps per movement, in some embodiments, are counted by controller 110 to determine an angle (e.g., first angle 306, second angle 308). In yet another embodiment, a DC motor with optical encoders on the shaft is used as an alignment device. As the DC motor rotates, light shines through slits in the optical encoder and controller 110 reads the number of slits that pass to determine how much the DC motor rotated. In an embodiment, a servo may be associated with changing the first angle 306, while another servo may be associated with aligning the second angle 308. One or more servos and alignment devices may be associated with each of the first angle 306 and the second angle 308.

In an embodiment, the controller 110 sends a third signal to the light emitting device 102 to illuminate the object 106 once the light emitting device 102 aligns with the object 106. In some embodiments, wireless device (e.g., first wireless device 104, second wireless device 108) sends a signal to the controller 110 that the light emitting device 102 and object 106 align. In other embodiment, the controller 110 otherwise identifies that the light emitting device 102 and object 106 align with each other. Determining that the light emitting device 102 aligns with the object 106 may depend on the type of light emitting device 102 being used. For example, a laser may be determined as aligning with object 106 when it is within a predetermined radius of the object 106 or second wireless device 108. In other embodiments, determining that the light emitting device 102 aligns with the object 106 may involve the light emitting device 102 being detected by the second wireless device 108. In yet other embodiments, the light emitting device 102 aligning with the object 106 may be determined by sensors, signals (e.g., first signal, second signal). A third signal, in some embodiments, contains instructions or commands to turn on the light emitting device 102 or otherwise cause light to illuminate the object 106. In another embodiment, alignment devices (e.g., servo) report its location to controller 110. The servo's actual rotation angle can be compared to the requested orientation angle. Once the angles are within an acceptable tolerance, controller 110 determines light emitting device 102 aligns with object 106. In some embodiments, the closest light emitting device 102 is determined using the distance formula (i.e., $d=\sqrt{(x_2-x_1)^2+(y_2-y_1)^2}$), where $x_1$ and $y_1$ are the x-coordinate and y-coordinate of the object 106 and $x_2$ and $y_2$ are the x-coordinate and y-coordinate of the light emitting device 102, respectively. Controller 110 may determine distance for all light emitting devices and select the closest light emitting device 102 to the object 106.

In another embodiment, the first wireless device 104 is a first tag, the second wireless device 108 is a second tag, and the first signal and the second signal may include real-time location data. As described above with respect to at least FIG. 1, in an embodiment, first wireless device 104 may be an RFID tag and the second wireless device 108 may also be an RFID tag. In other embodiments, wireless devices (e.g., first wireless device 104, second wireless device 108) include tablets, smartphones, GPS trackers, GPS systems, cellular trackers, near field tags, smart packing devices, Bluetooth™ trackers, or any other device with the ability to track location wirelessly. The first signal from the first wireless device 104 may include real-time location data of the light emitting device 102, first wireless device 104, or another item or device. In some embodiments, the second signal from the second wireless device 108 may include real-time location data of the object 106, second wireless device 108, or another item or device. As described above with respect to at least FIG. 1, real-time location data refers to continuously updated and current information about the position, location, or coordinates of an object 106, light emitting device 102, or other item or device. In some embodiments, the real-time location data is constantly refreshed, up-to-date, and precise. Real-time location data may be generated from GPS, RFID, Bluetooth™, Wi-Fi™, cellular network, or other location-based sensors and systems.

Figure 3B:
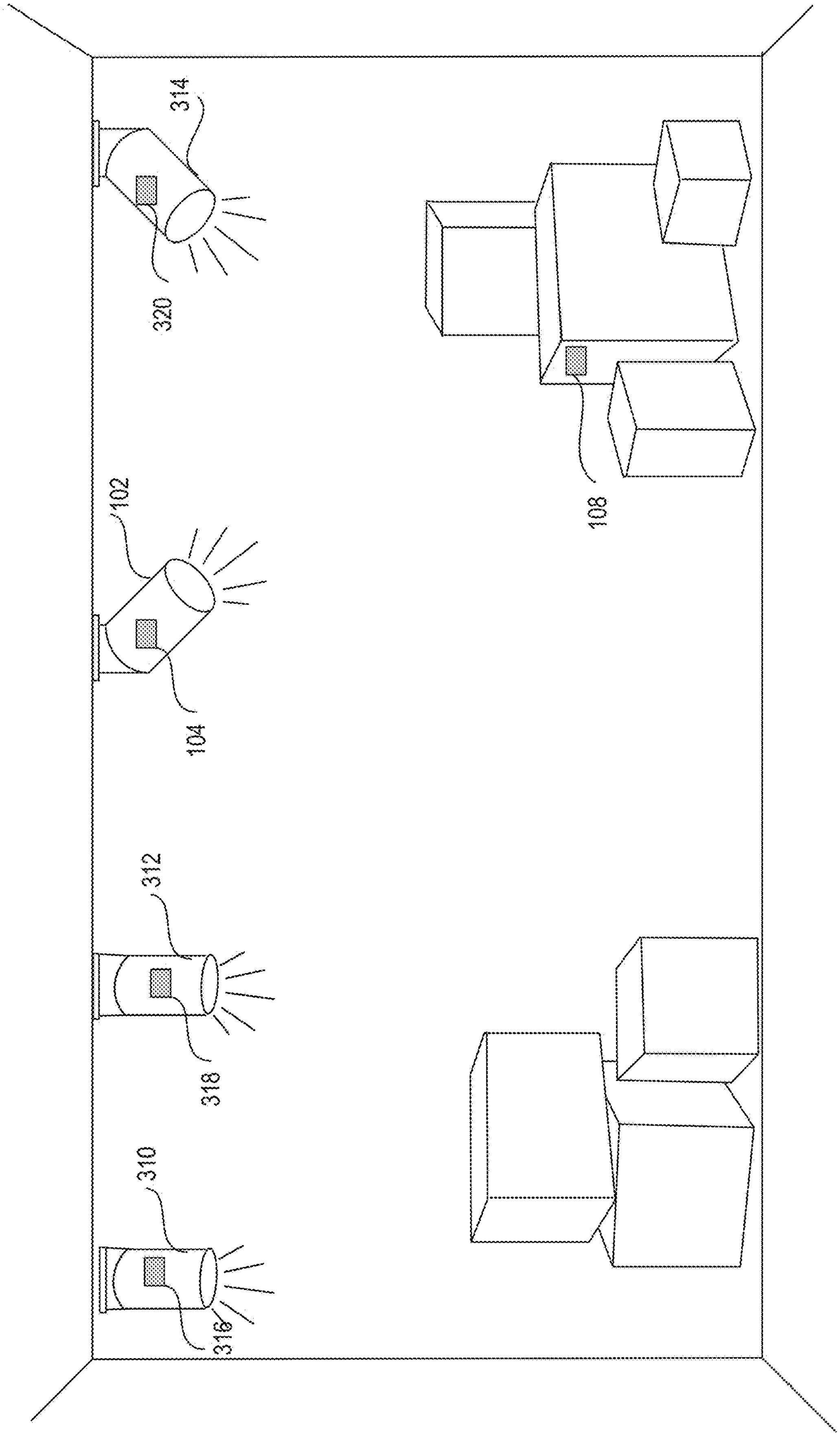

In some embodiments, as shown in FIG. 3B, the object locating system 100 may include a plurality of light emitting devices (e.g., light emitting device 102, second light emitting device 310, third light emitting device 312, fourth light emitting device 314). In some embodiments, second light emitting device 310, third light emitting device 312 and fourth light emitting device 314 may have similar structure and capabilities as light emitting device 102. In some embodiments, each light emitting device (e.g., light emitting device 102, second light emitting device 310, third light emitting device 312, fourth light emitting device 314) is associated with a respective wireless device. For example, object locating system 100 may include a plurality of light emitting devices 102. The light emitting devices may be configured in an array, grid, line, randomly positioned, or in another position. For example, light emitting device 102 may be associated with first wireless device 104, second light emitting device 310 may be associated with second wireless device 316, third light emitting device 312 may be associated with third wireless device 318, and fourth light emitting device 314 may be associated with fourth wireless device 320. In other embodiments, a wireless device (e.g., first wireless device 104) is associated with multiple light emitting devices (e.g., light emitting device 102, second light emitting device 310, third light emitting device 312, fourth light emitting device 314) 102 in proximity of one another.

In some embodiments, the plurality of light emitting devices (e.g., light emitting device 102, second light emitting device 310, third light emitting device 312, fourth light emitting device 314) or plurality of respective wireless devices (e.g., first wireless device 104, second wireless device 316, third wireless device 318, fourth wireless device 320) are configured in an array, mounted on the ceiling. Configuring the light emitting devices or first wireless devices in an array, in some embodiments, includes arranging or organizing the light emitting devices or first wireless devices in a structured and ordered manner. In some embodiments, an array includes a grid, a line, or any other geometric arrangement. As described above with respect to at least FIG. 1, mounting on the ceiling may involve fixing the light emitting devices or wireless devices on the upper surface of a room or building.

Controller 110, in some embodiments, may determine the closest light emitting device (e.g., light emitting device 102, second light emitting device 310, third light emitting device 312, fourth light emitting device 314) to the object 106, based on the positions of each light emitting device (e.g., light emitting device 102, second light emitting device 310, third light emitting device 312, fourth light emitting device 314) and the location of the object 106. Determining the closest light emitting device, in some embodiments, may involve comparing positions of each the light emitting device with the object 106, using sensors, comparing signal information, or any other way of comparing location information. In some embodiments, the position of the light emitting device 102 is determined by GPS, RFID, Bluetooth™, Wi-Fi™, machine learning, cellular network, geofencing, inertial navigation systems, sensors, satellite navigation systems, visual recognition, or computer vision technologies. The controller 110, in some embodiments, calculates the distance between the light emitting device and object 106 using geometric principles, as described above and determines the light emitting device with the shortest distance to the object 106 is the closest light emitting device.

Once the closest light emitting device has been determined, controller may calculate an orientation offset and distance to the object 106 with respect to the position of the closest light emitting device, as described above with respect to at least FIG. 2. Further, controller 110 may determine whether the second wireless device 108 is visible to the closest light emitting device based on the second signal, as described above with respect to at least FIG. 2.

In some embodiments, controller 110 may determine a first angle 306 and second angle 308 based on the orientation offset and the distance to the object 106, as described above with respect to at least FIG. 2. Further, in some embodiments, controller 110 may control one or more alignment devices using the first angle 306 and the second angle 308 to align the closest light emitting device (e.g., light emitting device 102, second light emitting device 310, third light emitting device 312, fourth light emitting device 314), as described above with respect to at least FIG. 2. In some embodiments, the controller 110 sends a third signal to the closest light emitting device to illuminate the object 106, once the closest light emitting device aligns with the object 106.

Figure 4:
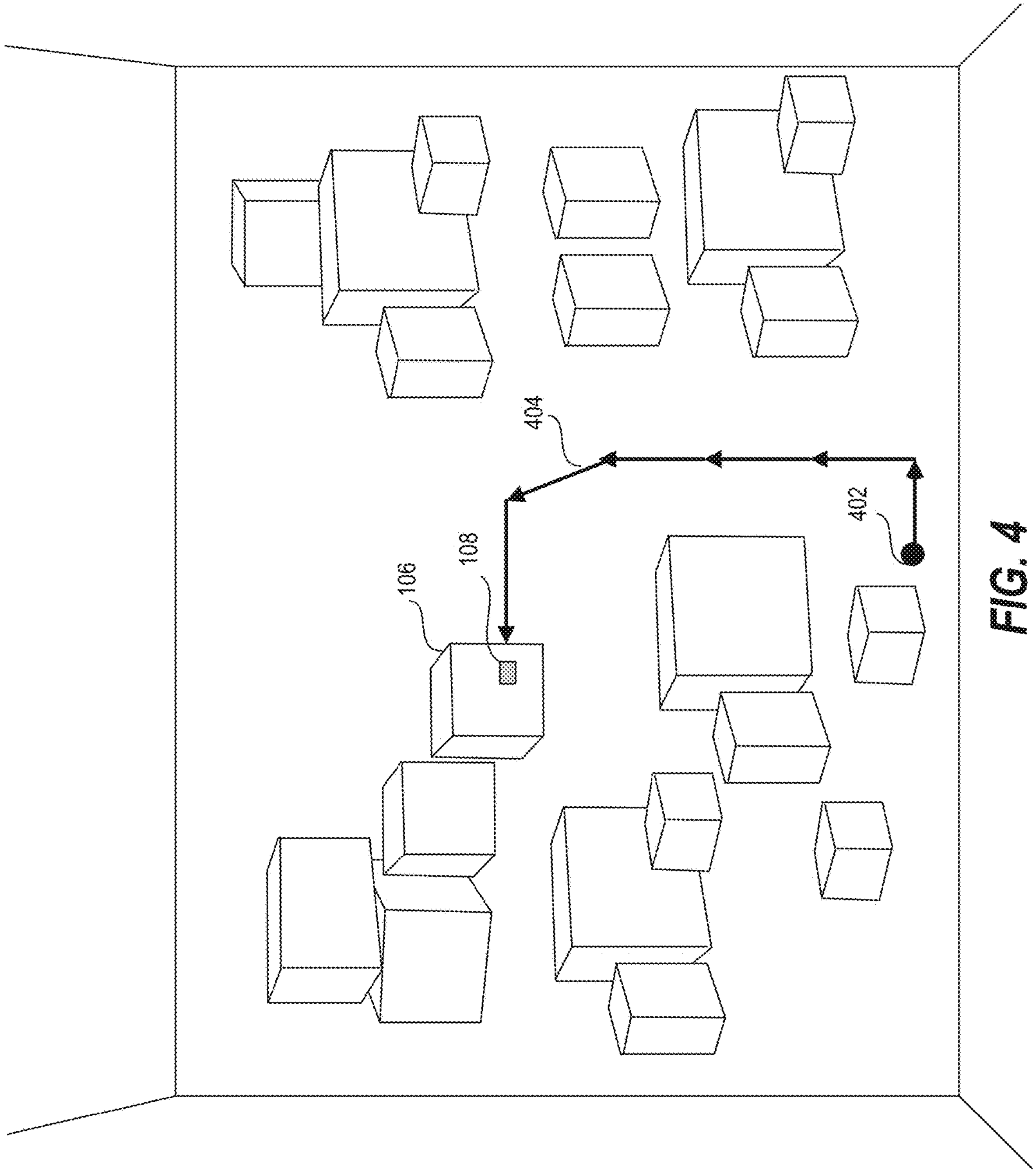
FIG. 4 is an illustration of exemplary directions illuminated by the light emitting devices, consistent with disclosed embodiments.

FIG. 4 depicts an exemplary object locating system, consistent with disclosed embodiments. As shown in FIG. 4, the controller 110 in object locating system 100 may determine a set of directions 404 from an initial location 402 to the object 106. The initial location 402 may be an initial point where the light emitting device 102 is pointing at or a predetermined initial point. In some embodiments, initial location 402 is a location of an object transport vehicle or a mobile device associated with a user. For example, in an embodiment, information is sent to a user's personal digital assistant indicating user needs to pick up an item. Directions 404, in one embodiment, illuminate on the floor of a warehouse, from the initial location 402 to the object 106. In further embodiments, RFID, GPS, sensors, or other technologies that determine location are used to determine initial location 402.

The controller 110 may determine a set of directions 404 from the initial location 402 based on the position of the light emitting device 102 and the location of the object 106. Directions refer to a course or path along which something moves, points, or extends. In some embodiments, directions 404 include arrows, lines, or other indications of pointing towards an object 106, device, location, or item. Directions 404, in some embodiments, include spatial orientations, instructions, guidance, alignment, or positioning. In some embodiments, controller 110 may be configured to generate directions 404 in real-time.

Further, controller 110 may control the alignment devices to align the light emitting device 102 with the directions 404. In some embodiments, the controller 110 considers real-time location information of the object and the light emitting device 102 to adjust directions 404. The controller 110 may, in some embodiments, send a third signal to the light emitting device 102 to illuminate the directions 404. In some embodiments, the directions 404 are illuminated at one time, showing a path. In other embodiments, the directions 404 are illuminated in segments, showing part of the path, and adapting as a user, vehicle, or device follows the path segments and moves closer towards the object 106.

In another embodiment, the object locating system includes a plurality of light emitting devices, as described with respect to FIG. 3B. Controller 110, in some embodiments, controls the alignment devices to align the closest light emitting device (e.g., light emitting device 102, second light emitting device 310, third light emitting device 312, fourth light emitting device 314) with the directions 404. In further embodiments, more than one light emitting device may be used to illuminate directions, depending on conditions such as the closest light emitting device (e.g., light emitting device 102, second light emitting device 310, third light emitting device 312, fourth light emitting device 314) to the initial location 402 and the directions 404. In some embodiments, one light emitting device (e.g., light emitting device 102, second light emitting device 310, third light emitting device 312, fourth light emitting device 314) may illuminate a segment of the directions 404, while another light emitting device (e.g., light emitting device 102, second light emitting device 310, third light emitting device 312, fourth light emitting device 314) illuminates the other segment of the directions 404.

In additional embodiments, the controller 110 is further configured to send the directions 404 to one or more personal digital assistant or object transport vehicle to follow. Personal digital assistant, in some embodiments, may be a tablet, computer, website, application, or other means of receiving and viewing information. In some embodiments, the directions 404 are depicted on a map on the personal digital assistant. Distances with turns based on the geometry of the room, facility, or service center, in some embodiments, may also be displayed on the personal digital assistant. In yet another embodiment, the light emitting device 102 guides a user in proximity to a trackable device (e.g., forklift or other object transport vehicle, cell phone, RFID tag) and uses light emitting device 102 to shine on the ground near the user and guide them to the object 106. In further embodiments, the directions 404 depicted on the personal assistant are updated in real-time. For example, in some embodiments, directions 404 are updated periodically, subject to a time constraint. In other embodiments, directions 404 are dynamically updated, as the user moves and the personal digital assistant sends location information to controller 110. In some embodiments, personal digital assistant is connected to the user interface where the object identifier was received from, as discussed with respect to at least FIG. 2.

In some embodiments, user may manipulate the directions 404 using the personal digital assistant. For example, user may zoom in, zoom out, change background screen, view an aerial image of the room or facility, view the object identifier, or otherwise view related information. Controller 110, in some embodiments, may send directions 404 to personal digital assistant wirelessly via Wi-Fi™, Bluetooth™, cellular network, near field communication, RFID, satellite, wireless sensor networks, or any other means of transmitting data, signals, or information.

Object transport vehicle refers to any vehicle or device designed to move or transport physical items (e.g., object 106, package) from one place or location to another. For example, in some embodiments, object transport vehicle may be a truck, forklift, pallet jack, cart, automobile, cargo truck, van, automated guided vehicle (AGV), utility cart, robotic vehicle, drone, or other any other vehicle used to move objects. In some embodiments, the directions 404 are sent to the object transport vehicle. Controller 110, in some embodiments, may send directions 404 to object transport vehicle wirelessly via Wi-Fi™, Bluetooth™, cellular network, near field communication, RFID, satellite, wireless sensor networks, or any other means of transmitting data, signals, or information. In some embodiments, directions 404 are shown on an object transport vehicle display, such as a tablet, computer, LCD display, or other means of showing information within the object transport vehicle. In some embodiments, the directions 404 are depicted on a map within the object transport vehicle. In further embodiments, the directions 404 depicted in the object transport vehicle may be updated in real-time, based on real-time data of the light emitting device 102, user, and object 106. In some embodiments, user may manipulate the directions 404 viewed in the object transport vehicle. For example, user may zoom in, zoom out, change background screen, view an arial image of the room or facility, view the object identifier, or otherwise view related information. In further embodiments, the object transport vehicle may be configured to automatically follow the directions 404. For example, in an embodiment, controller 110 may send directions 404 to object transport vehicle and object transport vehicle may automatically move towards object 106, following the directions. In other embodiments, user may move the object transport vehicle in the direction of the object 106, by following the directions 404. In further embodiments, object transport vehicle may include a heads-up display, illuminating directions 404.

Figure 5:
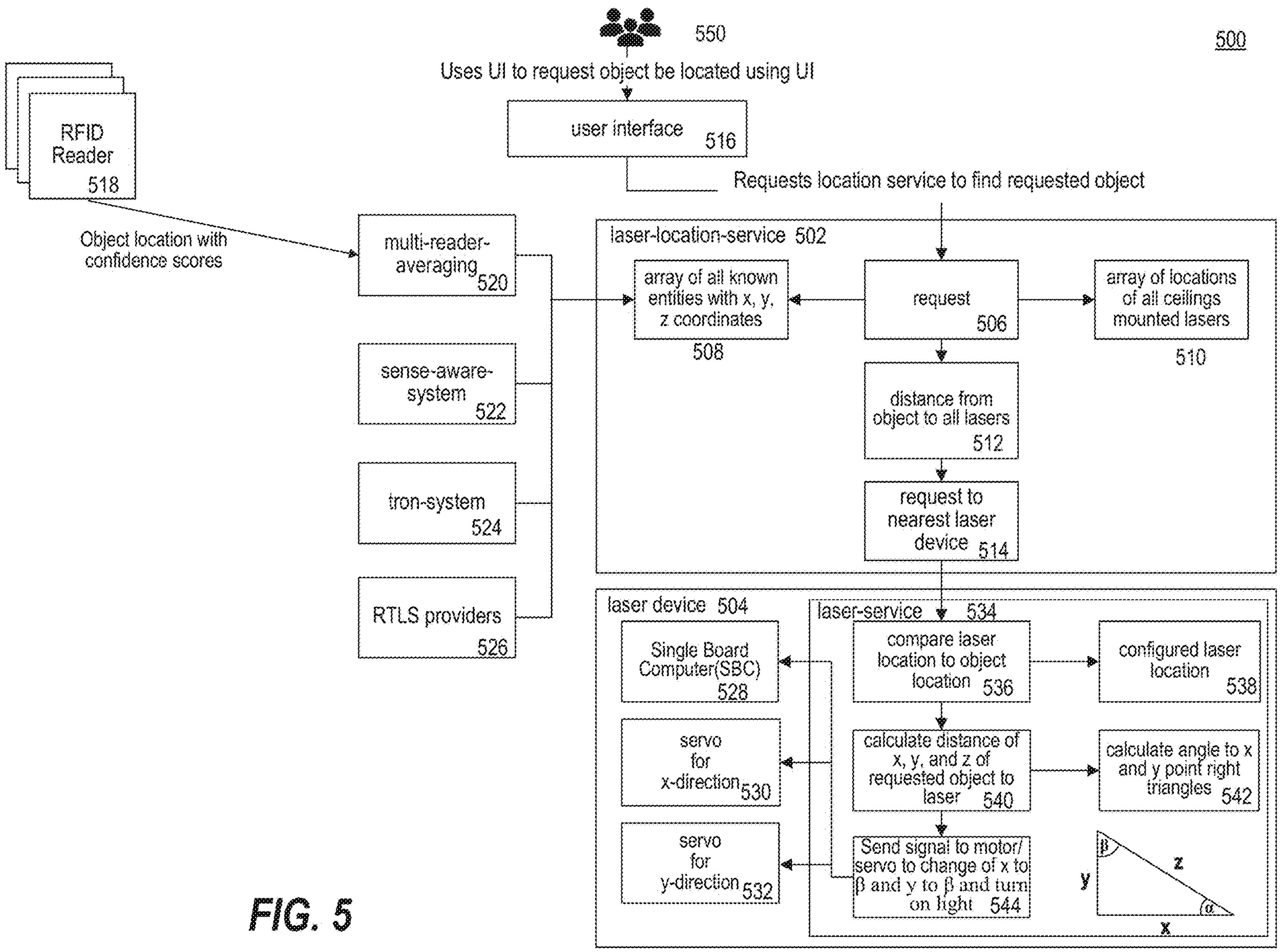
FIG. 5 is an exemplary object locating system, including a light emitting device and object, consistent with disclosed embodiments.

FIG. 5 depicts yet another exemplary object locating system, according to disclosed embodiments. It is to be appreciated object locating system 500 in some embodiments, refers to a system, method, or device that may be implemented in hardware or software. Further, object locating system 500 may include computer models and algorithms performed or executed by controller 110. In some embodiments, object locating system 500 includes a laser location service model 502 and a laser device model 504. In some embodiments, controller 110 causes laser location service model 502 and a laser device model 504 to perform or execute tasks. Controller 110 may also manipulate laser location service model 502 and a laser device model 504. It is to be appreciated laser location service model 502 and laser device model 504 may be implemented in hardware and/or software. In some embodiments, laser location service model 502 and laser device model 504 incorporate machine learning algorithms, trained models, feedback loops, or artificial intelligence to optimize the object locating system. For example, machine learning algorithms may be used for classification of data, regression algorithms may predict locations, and computer vision algorithms may optimize location information. In some embodiments, laser device model 504 uses machine learning algorithms to optimize calculations for determining distance of object 106 to laser. In other embodiments, machine learning algorithms use historical data to optimize adjustment of servo (e.g., servo for x-direction 530, servo for y-direction 532).

In an embodiment, the location of the object 106 is known and a machine learning model is trained against the known location and the RFID reported location. This machine learning model allows the system to know the actual location on the fringes of the read range of the RFID reader. In yet another embodiment, cameras in the room, facility, or service center take multiple photos of every object. The camera feed, in some embodiments, is used to train a machine learning vision model to determine the location (e.g., x-coordinate, y-coordinate) of object 106. Combining the machine learning vision model with tron data from tron system 524, RFID data, and ML vision data would result in greater location precision. In yet another embodiment, machine learning models detect outliers and make pointing the light emitting device 102 more stable, by reducing fluctuation of location. Machine learning vision models, in some embodiments, use cameras to compare the illuminated area to the area occupied by the object 106. Controller 110, in some embodiments, communicates with alignment devices and machine learning model to adjust the angle of the light emitting device 102 and precisely illuminate the object 106.

Laser location service model 502, in some embodiments, refers to a system, method, or device that determines the location of the plurality of light emitting devices (e.g., light emitting device 102, second light emitting device 310, third light emitting device 312, fourth light emitting device 314) and identify the closest light emitting device to the object 106. In some embodiments, laser location service model 502 includes a request 506, array of known entity coordinates 508, array of locations of ceiling mounted lasers 510, distance from object to lasers 512, and request to nearest laser device 514. It is to be appreciated that request 506, array of known entity coordinates 508, array of locations of ceiling mounted lasers 510, distance from object to lasers 512, and request to nearest laser device 514 may be or communicate with one or more of a database, file, cloud server, or any other means of storing information. Further, request 506, array of known entity coordinates 508, array of locations of ceiling mounted lasers 510, distance from object to lasers 512, and request to nearest laser device 514, in some embodiments, may be a computer program configured to execute instructions, input information, store information, manipulate information, output information, or otherwise make decisions. Further, request 506, array of known entity coordinates 508, array of locations of ceiling mounted lasers 510, distance from object to lasers 512, and request to nearest laser device 514 may include machine learning algorithms, feedback loops, and artificial intelligence.

In some embodiments, as shown in FIG. 5, the user 550 requests an object 106 (as shown in FIG. 1) be located by inputting an object identifier into a user interface 516. The user interface 516 may send the request from the user 550 to the laser location service model 502. Request 506, in some embodiments, refers to a system, method, or device that receives and stores the requested object information. Request 506, in some embodiments, receives the requested object information and queries an array for the location of the object 106.

The array of known entity coordinates 508, in some embodiments, refers to a system, method, or device that includes information related to the location of the request 506, as described in more detail below. Laser location service model 502 may query an array of all laser locations (e.g., array of locations of ceiling mounted lasers 510), based on the request from user 550, as described below in more detail.

As shown in FIG. 5, one or more RFID reader 518 may determine the location of the object 106. RFID reader 518, in some embodiments, outputs information including the location of the object 106, with confidence scores. Confidence scores refer to measurements of certainty or confidence associated with specific data points or predictions. In some embodiments, confidence scores provide insights into the reliability of a model, device, system, or program. For example, a confidence score may provide insight into the reliability of the location information from RFID readers 518. In some embodiments, calculating confidence scores involves assessing the reliability or certainty of data or predictions. For example, RFID reader sends multiple metrics, such as read count (i.e., the number of times the reader saw the tag within a compute window) to controller 110. Another metric includes the strength of RFID signal as it is returned to the RFID reader. When a tag has seen more than one RFID reader, the confidence score can be used to weigh the location of object 106. In some embodiments, the read count and strength of RFID signal are combined into a metric provided by the RFID reader to controller 110. The x-coordinate and y-coordinate location of object 106 are divided by the combined metric to determine the weighted location based on confidence.

By way of example, controller 110 runs a computer program which includes operations to calculate confidence score. Controller 110 running the program, in some embodiments, may input the read count and strength of RFID signal. In one embodiment, controller 110 may input and synchronize RFID tag locations. Controller 110 may add x-coordinate locations of the tag and computes an average x-coordinate location and may also add y-coordinate locations of the tag and compute an average y-coordinate location. If a RFID tag sees more than one RFID reader, controller 110 may use the confidence score to weigh the location of object 106. In some embodiments, controller 110 may divide the average x-coordinate location by a confidence weight and divide the average y-coordinate location by a confidence weight. Controller 110, in some embodiments, may output one or more of a timestamp, a tag location update event name, a last seen time of object 106, a confidence metric, or an array of confidence data.

For example, confidence score may provide information about the signal strength of the communication between RFID tags and readers. Higher signal strength, in some embodiments, indicates a more reliable and confident signal reception. Calculating the confidence score based on signal strength, in some embodiments, involves establishing a correlation between strong signals and reliable data. Other ways of determining a confidence score include taking multiple readings of signals. Consistent readings may increase confidence. In further embodiments, confidence score is determined by analyzing signal quality metrics such as signal-to-noise ratio (SNR) or bit error rate (BER). In some embodiments, a higher SNR or lower BER is associated with higher confidence scores. In yet further embodiments, signal score is determined based on analyzing historical data of signal performance. Inconsistent signal reception over time can influence confidence scores. In additional embodiments, machine learning models are trained on historical data to predict the reliability of signals and generate confidence scores. Machine learning models may consider various elements such as signal strength, environmental conditions, and historical performance to determine confidence scores. It is to be appreciated a multitude of factors can influence confidence scores.

The output of the RFID reader 518, in some embodiments, are signals or other forms of sharing location information. In some embodiments, the object 106 location is given in coordinates (e.g., x-coordinate, y-coordinate, z-coordinate). In some embodiments, the output of the RFID reader 518 is stored in a database, file, API, external system, or other means of storing information. In some embodiments, the RFID reader 518 updates the location information of the object 106 in real-time.

In some embodiments, the output of one or more RFID readers 518 (e.g., location information of object 106) is input into a multi-reader averaging model 520. Multi-reader averaging model 520, in some embodiments, refers to a system, method, or device that inputs the location information from RFID reader 518 and averages the location information or otherwise optimizes the location information. The multi-reader averaging model 520 may output the averaged or optimized location information. The averaged location information from multi-reader averaging model 520, in some embodiments, may be combined with information generated from other systems such as sense-aware system 522, tron system 524, and RTLS providers 526. Sense-aware system 522 may include location information of object 106 from sensors, sensor networks, IoT networks, or any other system involving sensors.

Sense-aware system 522, in some embodiments, refers to a system, method, or device that provides additional location information about the location of the object 106. Tron system 524, in some embodiments, refers to a system, method, or device that utilizes Bluetooth™ low energy (BLE) and The Real-time Operating system Nucleus (TRON) for tracking location in real-time. In some embodiments, tron system 524 allows light emitting device 102 to illuminate objects 106 tracked by wireless technologies such as RFID and BLE. In some embodiments, machine learning is used to identify object 106 and provide the associated x-coordinate and y-coordinate. Real-time location system (RTLS) providers 526 in some embodiments, refers to a system, method, or device that manage and track real-time location of objects within a defined space. For example, RTLS providers 526 may use a combination of technologies, such as RFID, GPS, Bluetooth™, Wi-Fi™ to provide real-time location information.

It is to be appreciated data, information, and signals from multi-reader averaging model 520, sense-aware system 522, tron system 524, and RTLS providers 526 may communicate with laser location service model 502 wirelessly, for example using GPS, Bluetooth™, Wi-Fi™, or cellular networks. Further, sense-aware system 522, tron system 524, and RTLS providers 526 may each store information or send information to files, databases, clouds, or other means of storing information. In some embodiments, multi-reader averaging model 520, sense-aware system 522, tron system 524, and RTLS providers 526 are computer models or algorithms that may input information, store information, execute tasks, manipulate information, and output information. Further multi-reader averaging model 520, sense-aware system 522, tron system 524, and RTLS providers 526 may include artificial intelligence, machine learning, feedback loops, real-time data, and any other means of optimizing information.

In some embodiments, information from multi-reader averaging model 520, sense-aware system 522, tron system 524, and RTLS providers 526 may be combined and input into array of known entity coordinates 508. The array of known entity coordinates 508, in some embodiments, refers to a system, method, or device that includes, stores, manipulates, or outputs x, y, and z coordinates of object 106 or second wireless device 108. In some embodiments, array of known entity coordinates 508 is a data structure that stores the collection of x, y, and z-coordinates of object 106.

Array of locations of ceiling mounted lasers 510, in some embodiments, refers to a system, method, or device that includes information related to the locations of all ceiling mounted light emitting devices (e.g., lasers) or respective first wireless device (e.g., first wireless device 104). In some embodiments, administrator inputs or manipulates location information into array of locations of ceiling mounted lasers 510. In some embodiments, array of locations of ceiling mounted lasers 510 may include x, y, and z-coordinates of lasers. Further, array of locations of ceiling mounted lasers 510 may store, manipulate, and output known coordinates of ceiling mounted lasers. In some embodiments, array of locations of ceiling mounted lasers 510 is a data structure that stores the collection of x, y, and z-coordinates of light emitting device 102 (e.g., lasers).

Request 506, in some embodiments, may input data from array of known entity coordinates 508 and array of locations of ceiling mounted lasers 510. Distance from object to lasers 512, in some embodiments, may input the information from request 506, array of known entity coordinates 508 and array of locations of ceiling mounted lasers 510. In some embodiments, distance from object to lasers 512 refers to a system, method, or device that calculates the distance from the object 106 to all lasers, using geometric principles (e.g., Pythagorean theorem). In some embodiments, distance from object to lasers 512 calculates the orientation offset. Distance from object 106 to lasers and orientation offset may be stored or manipulated in distance from object to lasers 512.

In some embodiments, distance from object to lasers 512 is a data structure that stores the collection of distances between object 106 and all light emitting devices 102 (e.g., laser).

Based on information from distance from object to all lasers 512, in some embodiments, request to nearest laser device 514 refers to a system, method, or device that determines the nearest laser device to the object 106 and sends a request to the nearest laser device. Request to the nearest laser device 514, in some embodiments, refers to a system, method, or device that sends a signal (e.g., sent over Wi-Fi™, cellular network, Bluetooth™) to the nearest laser device. In some embodiments, the request includes tasks or other forms of information.

Laser device model 504, in some embodiments, refers to a system, method, or device that controls the nearest laser device determined by request to nearest laser device 514. Laser device model 504, in some embodiments includes single board computer 528, servo for x-direction 530, servo for y-direction 532, and laser service model 534. It is to be appreciated that laser device model 504 may be a system, method, or device that configured to execute instructions, input information, store information, manipulate information, output information, or otherwise make decisions or communicate with one or more of a database, file, cloud server, or any other means of storing information. Further, laser device model 504 may include machine learning algorithms, feedback loops, and artificial intelligence.

Single board computer 528, in some embodiments may include CPU, RAM, storage, input/output interfaces, and other features of a computer. Single board computer 528 may be designed to perform specific computing tasks and applications. Non-limiting examples of single board computer 528 include Raspberry Pi™ single-board computer, Arduino™ open-source single-board microcontroller platform, BeagleBone Black™ single-board computer, and Odroid™ single-board computer. Single board computer 528, in some embodiments, may control the laser device model 504 and laser service model 534. Single board computer 528 may generate, follow, and send commands. It is to be appreciated single board computer 528 may be implemented in hardware and software.

Servo for x-direction 530 refers to a system, method, or device designed to control the movement or position of the light emitting device 102 in the horizontal, or x-axis using a servo motor. Servo for x-direction 530 may precisely control the position, velocity, and acceleration of light emitting device 102. Servo for x-direction 530, in some embodiments, may include a motor, a control circuit, and a feedback system. In some embodiments, servo for x-direction 530 may include a feedback mechanism that continuously monitors the position of the light emitting device 102 and/or object 106 in the x-direction and adjusts the motor's output to maintain the desired position. In other embodiments, other types of motors can be used to control light emitting device 102.

Servo for y-direction 532 refers to a system, method, or device designed to control the movement or position of the light emitting device 102 in the vertical, or y-axis using a servo motor. Servo for y-direction 532 may precisely control the position, velocity, and acceleration of light emitting device 102. Servo for y-direction 532, in some embodiments, may include a motor, a control circuit, and a feedback system. In some embodiments, servo for y-direction 532 may include a feedback mechanism that continuously monitors the position of the light emitting device 102 and/or object 106 in the y-direction and adjusts the motor's output to maintain the desired position. In other embodiments, other types of motors can be used to control light emitting device 102.

Laser service model 534, in some embodiments, refers to a system, method, or device that compares the nearest laser location to the location of the object 106. In some embodiments, laser service model 534 may be part of laser device model 504. In other embodiments, laser service model 534 is separate from laser device model 504. It is to be appreciated that laser service model 534 may be a system, method, or device configured to execute instructions, input information, store information, manipulate information, output information, or otherwise make decisions or communicate with one or more of a database, file, cloud server, or any other means of storing information. Further, laser service model 534 may include machine learning algorithms, feedback loops, and artificial intelligence. Laser service model 534, in some embodiments, compares the nearest laser location to the object 106, as shown in step 536. Further, laser service model 534 may calculate an x, y, and z (i.e., horizontal, vertical, and diagonal) distance of the object to the nearest laser, as shown in step 540. In some embodiments, laser service model 534 calculates a first angle 306 and second angle 308 based on the calculated distance to the object 106, as shown in step 542. Further, laser service model 534 may send one or more signals to servo for x-direction 530 or servo for y-direction 532 to change the x and y directions of the laser to the first angle 306 and the second angle 308, as shown in step 544. In further embodiments, laser service model 534 sends a signal to the nearest laser to turn on the laser, as shown in step 544.

Figure 6:
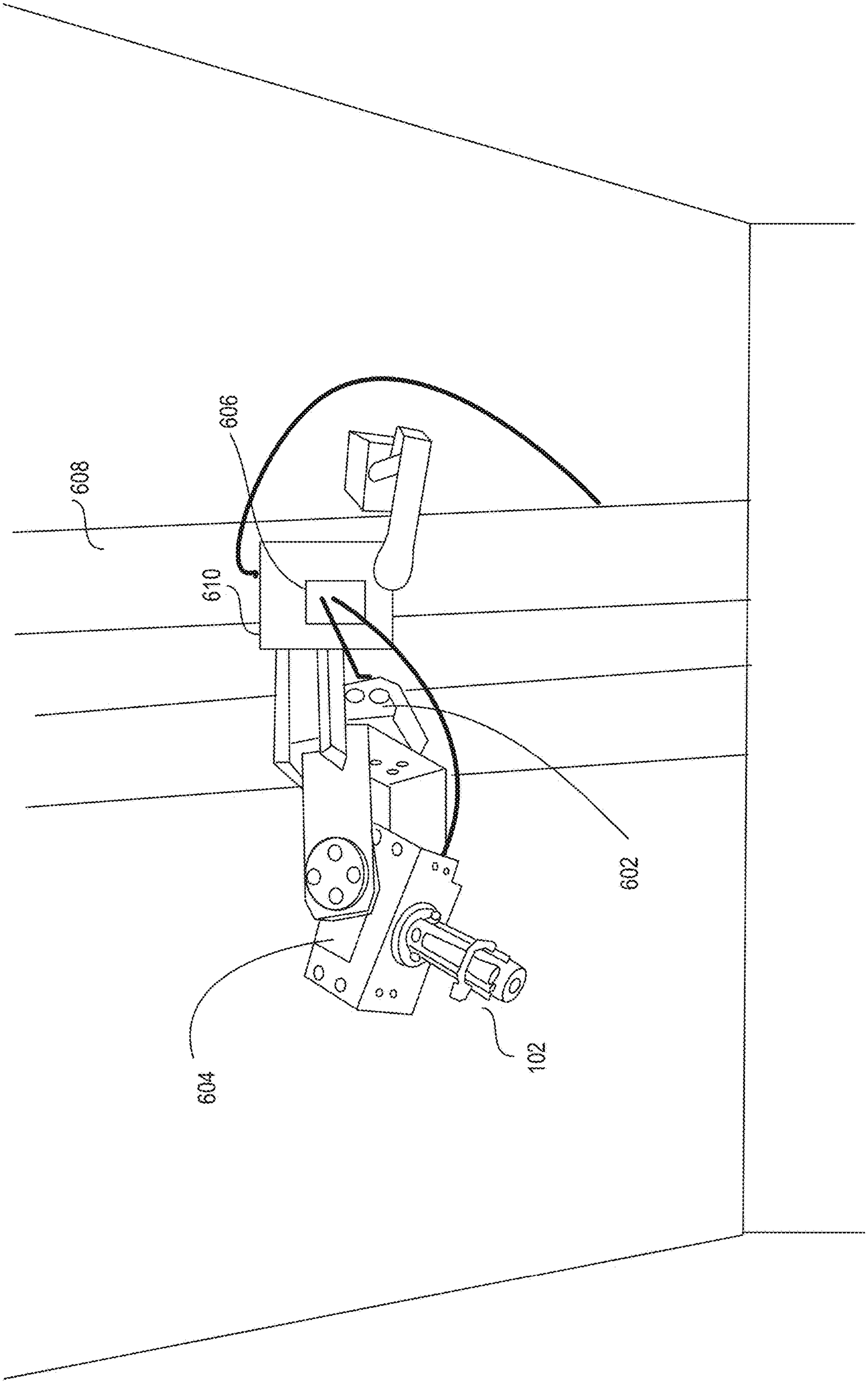
FIG. 6 is an exemplary object light emitting device with an x-direction servo and a y-direction servo for aligning the light emitting device, consistent with disclosed embodiments.

FIG. 6 depicts light emitting device 102, x-direction motor 602, y-direction motor 604, baseplate 610, and metal rafters 608, consistent with disclosed embodiments. Baseplate 610 is a surface that serves as a foundation or support for components such as first wireless device 104, light emitting device 102, x-direction motor 602, and y-direction motor 604. Baseplate 610, in some embodiments, is made out of materials such as steel, concrete, aluminum, or wood. In some embodiments, baseplate 610 is mounted to metal rafters 608 of ceiling or any other surface in room or facility. Alignment devices (e.g., x-direction motor 602, y-direction motor 604) attach to light emitting device 102 and baseplate 610, controlling the x and y-direction of the light emitting device 102.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. Furthermore, non-transitory computer-readable media can contain instructions, that when executed by one or more processor or processing device, cause a computing system (e.g., a cloud computing platform, computing cluster, or the like) to implement the disclosed systems and methods. In addition, while certain components have been described as being coupled to one another, such components may be integrated with one another or distributed in any suitable fashion.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An object locating system, comprising:

a first wireless device associated with a light emitting device;

a second wireless device associated with an object;

a controller configured to:

receive an object identifier;

determine a position of the light emitting device based on a first signal associated with the first wireless device;

determine a location of the object based on a second signal associated with the second wireless device;

calculate an orientation offset and a distance to the object with respect to the position of the light emitting device;

determine whether the second wireless device is visible to the light emitting device based on the second signal;

determine a first angle and a second angle based on the orientation offset and the distance to the object; and control one or more alignment devices based on the first angle and the second angle to align the light emitting device with the object.

2. The object locating system of claim 1, wherein:

the first wireless device is a first tag;

the second wireless device is a second tag; and the first signal and the second signal comprise real-time location data.

3. The object locating system of claim 2, wherein determining whether the second wireless device is visible to the light emitting device is based on the real-time location data.

4. The object locating system of claim 1, wherein the controller is further configured to compare the position of the light emitting device to the location of the object to calculate the orientation offset and distance to the object.

5. The object locating system of claim 1, wherein the second angle is calculated based on the first angle.

6. The object locating system of claim 1, wherein one or more alignment devices are controlled based on the first angle and one or more alignment devices are controlled based on the second angle.

7. The object locating system of claim 1, wherein the controller is further configured to send a third signal to the light emitting device to illuminate the object once the light emitting device aligns with the object.

8. The object locating system of claim 1, wherein at least one of the first wireless device or the light emitting device is mounted on a ceiling.

9. The object locating system of claim 1, wherein the controller is further configured to:

determine a set of directions from an initial location to the object;

control the alignment devices to align the light emitting device with the directions; and send a third signal to the light emitting device to illuminate the directions.

10. The object locating system of claim 9, wherein the controller is further configured to send the directions to one or more of a personal digital assistant or object transport vehicle to follow.

11. The object locating system of claim 1, wherein the light emitting device comprises a directionally sensitive array.

12. An object locating system, comprising:

a plurality of light emitting devices comprising at least three light emitting devices, wherein each light emitting device is associated with a respective first wireless device;

a second wireless device associated with an object;

a controller configured to:

receive an object identifier;

determine a position of each light emitting device based on a first signal associated with each first wireless device;

determine a location of the object based on a second signal associated with the second wireless device;

determine the closest light emitting device to the object, based on the positions of each light emitting device and the location of the object;

calculate an orientation offset and a distance to the object with respect to the position of the closest light emitting device;

determine whether the second wireless device is visible to the closest light emitting device based on the second signal;

determine a first angle and a second angle based on the orientation offset and the distance to the object; and control one or more alignment devices using the first angle and the second angle to align the closest light emitting device with the object.

13. The object locating system of claim 12, wherein:

the first wireless device is a first tag;

the second wireless device is a second tag; and the first signal and the second signal comprise real-time location data.

14. The object locating system of claim 12, wherein the plurality of light emitting devices or the plurality of respective first wireless devices are configured in an array mounted on a ceiling.

15. The object locating system of claim 12, wherein the controller sends a third signal to the closest light emitting device to illuminate the object once the closest light emitting device aligns with the object.

16. The object locating system of claim 12, wherein the controller is further configured to:

determine a set of directions from an initial location to the object; and control the alignment devices to align the closest light emitting device with the directions; and send a third signal to the closest light emitting device to illuminate the directions.

17. The object locating system of claim 16, wherein the controller is further configured to send the directions to one or more of a personal digital assistant or object transport vehicle to follow.

18. The object locating system of claim 12, wherein the light emitting device comprises a directionally sensitive array.

19. A method for illuminating an object comprising:

receiving an object identifier;

determining, using a controller, a position of a plurality of light emitting devices comprising at least three light emitting devices based on a first wireless device associated with each respective light emitting device;

determining, using the controller, a location of the object based on a second wireless device associated with the object;

determining the closest light emitting device to the object, based on the positions of each light emitting device and the location of the object;

calculating an orientation offset and a distance to the object with respect to the position of the closest light emitting device;

determining whether the second wireless device is visible to the closest light emitting device based on a signal from the second wireless device;

determining a first angle and a second angle based on the orientation offset and the distance to the object;

controlling one or more alignment devices using the first angle and the second angle to align the closest light emitting device with the object; and sending an illumination signal to the closest light emitting device to illuminate the object once the closest light emitting device aligns with the object.

20. The method for illuminating an object of claim 19, further comprising:

determining a set of directions from an initial location to the object;

controlling the alignment devices to align the closest light emitting device with the directions; and sending a signal to the closest light emitting device to illuminate the directions.

* * * * *